United States Patent
Ben-Shalom et al.

(10) Patent No.: US 7,719,501 B2
(45) Date of Patent: May 18, 2010

(54) DISTINCT COLOR LCD APPARATUS

(75) Inventors: Amir Ben-Shalom, Modin (IL); David Coates, Dorset (GB)

(73) Assignee: Magink Display Technologies Ltd., Mevasseret Zion (IL)

( * ) Notice: Subject to any disclaimer, the term of this patent is extended or adjusted under 35 U.S.C. 154(b) by 469 days.

(21) Appl. No.: 10/529,377

(22) PCT Filed: Sep. 30, 2003

(86) PCT No.: PCT/IL03/00783

§ 371 (c)(1), (2), (4) Date: Apr. 13, 2005

(87) PCT Pub. No.: WO2004/030335

PCT Pub. Date: Apr. 8, 2004

(65) Prior Publication Data

US 2006/0007090 A1    Jan. 12, 2006

(30) Foreign Application Priority Data

Sep. 30, 2002    (IL)    ..................... 152029

(51) Int. Cl.
G09G 3/36    (2006.01)
(52) U.S. Cl. .............. 345/87; 345/76; 345/78; 345/176
(58) Field of Classification Search .......... 345/87, 345/78, 176, 76
See application file for complete search history.

(56) References Cited

U.S. PATENT DOCUMENTS

| | | | |
|---|---|---|---|
| 5,193,015 A * | 3/1993 | Shanks | 349/115 |
| 5,796,447 A * | 8/1998 | Okumura et al. | 349/33 |
| 6,094,249 A * | 7/2000 | Robinson et al. | 349/141 |
| 6,317,189 B1 * | 11/2001 | Yuan et al. | 349/176 |
| 6,414,669 B1 | 7/2002 | Masazumi | |
| 6,507,331 B1 * | 1/2003 | Schlangen et al. | 345/100 |

(Continued)

FOREIGN PATENT DOCUMENTS

WO    WO 98/50804 A2    11/1998

(Continued)

OTHER PUBLICATIONS

Kawata, Yasushi et al., "A High Reflective LCD with Double Cholesteric Liquid Crystal Layers", Materials and Devices Laboratories, Toshiba Corporation, *SID* 97, pgs. 246-249 (1997).

(Continued)

*Primary Examiner*—Bipin Shalwala
*Assistant Examiner*—Afroza Y Chowdhury
(74) *Attorney, Agent, or Firm*—Pearl Cohen Zedek Latzer, LLP (57) ABSTRACT

A distinct color LCD apparatus including at least two layers of respectively disparate encapsulated liquid crystal materials; Structural means for maintaining said layers proximate to each other and in a substantially parallel orientation; Electrically conductive means for addressing at least one substantially parallel address across the encapsulated liquid crystal material in each of the respective layers; and Coordinated with said means for addressing, an electrical pulse driving means (I) wherein a state is selected from the list Homeouopre and planar and (U) whereby said state is communicated to a predetermined address between one of said parallel layers.

21 Claims, 7 Drawing Sheets

U.S. PATENT DOCUMENTS

| | | | |
|---|---|---|---|
| 6,618,102 B2 * | 9/2003 | Harada et al. | 349/78 |
| 6,717,640 B2 * | 4/2004 | Sato et al. | 349/112 |
| 6,928,271 B2 * | 8/2005 | Fish et al. | 455/97 |
| 7,205,970 B2 * | 4/2007 | Kim et al. | 345/89 |
| 2001/0012080 A1 | 8/2001 | Barberi et al. | |
| 2002/0093471 A1 * | 7/2002 | Roosendaal | 345/87 |
| 2002/0149552 A1 * | 10/2002 | Fish et al. | 345/88 |
| 2003/0034945 A1 * | 2/2003 | Mi et al. | 345/89 |
| 2003/0151580 A1 * | 8/2003 | Ma | 345/96 |
| 2008/0198173 A1 * | 8/2008 | Coates et al. | 345/596 |
| 2009/0174643 A1 * | 7/2009 | Ben Shalom et al. | 345/94 |
| 2009/0189847 A1 * | 7/2009 | Hughes et al. | 345/103 |
| 2009/0303259 A1 * | 12/2009 | Shalom et al. | 345/690 |

FOREIGN PATENT DOCUMENTS

| | | |
|---|---|---|
| WO | WO 01/88688 A1 | 11/2001 |

OTHER PUBLICATIONS

Nahm, X. Y., et al., "Amorphous Silicon Thin-Film Transistor Active-Matrix Reflective Cholesteric Liquid Crystal Display", *Asia Display* 98, pp. 979-982 (1998).

Huang, X Y et al., "Full Color (4096 Colors) Reflective Cholesteric Liquid Crystal Display", Proceedings of the 18$^{th}$ International Display Research Conference, Asia Display, vol. 98, 1998, pp. 883-886.

Huang, X Y et al., "LP-1: Late News Poster: Gray Scale of Bistable Reflective Cholesteric Displays", Sld International Symposium Digest of Technical Papers, vol. 29, 1998, pp. 810-813.

* cited by examiner

DISTINCT COLOR LCD APPARATUS

FIELD OF THE INVENTION

Generally, the present invention relates to Liquid Crystal technology based Display devices and to components and methods use therewith. More specifically, the present invention relates to an improved high contract Liquid Crystal Display apparatus.

BACKGROUND OF THE INVENTION

Multi-color Cholesteric Liquid Crystal Display (LCD) devices are generally constructed with at least two glass-encapsulated parallel layers of disparate Liquid crystal materials wherein each layer has a respectively parallel addressing scheme of substantially transparent conductor to predetermined regions in each layer. Cholesteric liquid crystal display devices can be either mono-color or multicolor.

Mono-color devices typically have one liquid crystal layer and multicolor typically have two or more liquid crystal layers. Each of these predetermined layers has an upper glass conductor location and an opposite lower glass conductor location such that a specific voltage even between the two will "drive" the liquid crystal material there-between into a desired optical state. Three such optical states are commonly encountered and are planar, Homeotropic, and focal-conic.

Most current liquid crystal displays use a nematic-based technology in which two states are used. The twisted nematic device is the most common. One state is the field-applied state and the second is a non-field applied state. In most cases, the field on state consists of molecules that are aligned with their long molecular axis parallel to the electric field direction (and induced Homeotropic State). The field off state is an aligned homogeneous state (long molecular axis parallel to the glass substrates). Both states are optically transparent. To achieve gray level intermediate states intermediate voltage levels are used. The position of the molecules is observed by using polarized light and the molecules of the liquid crystal phase act as variable "retarders" to the polarized light. It is generally desired in the LCD industry to achieve high graphic resolution (ultra small pixels), video refresh rates, variable "gray" levels for each color layer, and to use low voltage.

Bi-stable display modes such as the cholesteric liquid crystal display traditionally operate between two stable states (planar and focal conic); an applied electric field is used to transfer between these states usually via a meta-stable stable (Homeotropic State). The planar state consists of an aligned helix of molecules the molecules lie substantially parallel to the glass substrates and it reflects light of a specific wavelength that is proportional to the pitch length of the cholesteric liquid crystal. Any light scattering that does occur is not intended and the phase is substantially transparent. The focal conic state consists of many randomly arranged cholesteric helices that are too small to reflect light but can cause scattering of incident light. This state is therefore not transparent but slightly light scattering. This reduces the contrast and limits the color gamut in multicolor devices; thus, the colors are less vivid. The contrast between these two states is emphasized by the use of a black absorber placed behind the layer(s) of liquid crystal that absorbs transmitted light. The observer then either sees only the reflected ray from the planar texture or the black absorber that is apparent when the cholesteric liquid crystal is in the focal conic texture. Intermediate gray levels arise from areas that are brought into a state that has both states present. If several different color layers are used and each is in the planar texture wavelengths from the entire visible spectrum can be reflected and the device appears white. By selecting the layers that will reflect many colors can be reflected including gray levels of these colors.

It is an amazing historical anomaly that in such displays the two stable states have been almost exclusively used.

SUMMARY OF THE INVENTION

The present invention relates to embodiments of a distinct color LCD apparatus (mono or multicolor) including: at least two layers of respectively disparate encapsulated liquid crystal materials; structural means for maintaining the layers proximate to each other and in a substantially parallel orientation; electrically conductive means for addressing at least one substantially parallel address across the encapsulated liquid crystal material in each of the respective layers; and coordinated with the means for addressing, an electrical pulse driving means—wherein a state is selected from the list Homeotropic and planar, and whereby the state is communicated to a predetermined address between one of the parallel layers.

Simply stated, maintaining the Homeotropic State at a location in an encapsulated liquid crystal layer requires continuously driving an electrical waveform through that portion of the layer—in order to maintain that location in a substantially homogeneously aligned orientation. The waveform must substantially be of sufficient voltage to move the Liquid crystal material into the desired state. This voltage, referred to as the critical voltage or V4 on an Electro-Optical Curve, is dependent on numerous physical factors—such as temperature LC layer thickness, etc. When the orientation of the molecules of the liquid crystal phase are substantially perpendicular to the layer, the location in the layer is "perceived" as being totally transparent—meaning that it allows unobstructed substantially non-opaque viewing of any underlying layer (e.g. another liquid crystal layer, or a black or colored absorber back); in the at least two layers. Alternatively, when the waveform at this voltage is discontinued, then the LC material proceeds through a rapid transition to a planar state—which is the LC specific colored state.

For practical purposes, a synthetic perceivable gray level can be maintained by "managing" the location with a predetermined duration in the Homeotropic State (induced nematic), a predetermined duration in the planar state, and remaining fractional duration's in transition between planer and Homeotropic States or between Homeotropic and planar states. Simply stated, a 50% gray level would require about 50% of the time in Homeotropic State and about 50% of the time in planar state. Nevertheless, care is advised in selecting the frequency of the duration fragments in each state so that there is little or no appearance of visual flicker—gray level instability or fluctuation.

Generally, there are two specifically interesting manifestations of embodiments of the present invention: a pixel matrix architecture and single pixel architecture. The pixel matrix architecture is comprised of a plurality of substantially parallel layers each respectively containing an encapsulated dynamic material (e.g. LC) and preferably having a common (to the plurality of encapsulations) black back layer; wherein there is a multi-pixel address-ability in each layer (of dynamic material encapsulation). Alternatively, the single pixel architecture does not require complex internal layer segmentation to facilitate partitioned address access for manipulating portions of the dynamic material, but preferably also includes a black (light absorbent) back layer.

In the present invention, the address or access parameter is used to drive encapsulated LC using electric fields, thereby manipulating the material into Homeotropic State or planar state. In the Homeotropic State, incident light substantially traverses through the layer; which is essentially maximally transparent for most optical frequencies of incident light—substantially neither reflective nor opaque. Accordingly, the incident light arrives at the next layer of the plurality of layers (in multicolor devices) where it is subject to similar electric field manipulation decision, etc. or proceeds to the back most layer—which is preferably black, it should be noted that the electric field in each layer is essentially parallel to the line of the observer—and of like alignment from layer to layer in the plurality. This orientation of the electric field provides optimal predetermined frequency reflectivity. In our experiments, the driving to induce the Homeotropic State is approximately 6 to 7 volts per micron thickness of the liquid crystal layer. The nematic to Homeotropic transition is a field effect and thus quoted as volts per micron cell thickness. Typically, for our cells, it is about 7 v (depends to a small extent on polyimide thickness on the ITO, alignment type, and cell gap).

The preferred back layer is black—having maximum absorption in optical frequencies. (However in some monocolor devices this may be colored to allow other effects such as blue and white displays.) Alternatively, the black may be tinted to compensate for the frequency response of the most-proximate encapsulated layer—when in the Homeotropic State. The use of maximal absorption black enhances the overall contrast of the display.

The Homeotropic State is maintained using fixed voltage or using electric pulses or the likes (as is described in detail below). Preferably, advantage is made of the physics wherein LC rapidly traverses from state to state with the application of the electric field; essentially within the first few milliseconds or so. Accordingly, the present invention is also applicable to video frame rate applications. Specifically, selection of a time slot during a single video frame allows calibration of the level of layer transparency with respect to the level of color reflectivity—thereby allowing precise control of the reflective spectrum from each respective addressable area.

The following chart presents experimental measurements made on a VL 7"×7" module. (Measurement Temperature: Approximately 25~30 Celsius) The basic specification for the VL module is a three cell "sandwich" where each cell is made of two sheets of glass coated with ITO (a clear conductive layer) and a PI (polyimide) layer. For the blue and green cells the cell gap is ~5 microns while for the red layer the cell gap is slightly thicker—closer to 6 microns. The front layer blue LC is Merck MDA-00-3906. The middle layer green LC is Merck MDA-00-6907. The back layer red LC is Merck MDA-01-1. The common back layer (behind the three colored layers) is a substantially light absorbent black—Z-65/GL black absorbent paint designed for screen-printing on gins.

|  | Percent Reflectance | X of Chromaticity diagram (CIE 1931) | Y of Chromaticity diagram (CIE 1931) | Contrast Ratio |
| --- | --- | --- | --- | --- |
| Green | 14.7 | 0.24 | 0.4 | |
| Blue | 6.59 | 0.16 | 0.16 | |
| Red | 8.08 | 0.46 | 0.37 | |
| \\\ | | 0.24 | 0.4 | 49.36 |
| Black | 0.51 | 0.31 | 0.33 | |
| White | 25.4 | 0.26 | 0.3 | |
| Green | 14.4 | 0.23 | 0.36 | |
| Blue | 8.26 | 0.18 | 0.18 | |
| Red | 10.4 | 0.38 | 0.34 | |

-continued

|  | Percent Reflectance | X of Chromaticity diagram (CIE 1931) | Y of Chromaticity diagram (CIE 1931) | Contrast Ratio |
| --- | --- | --- | --- | --- |
| \\\ | | 0.23 | 0.36 | 6.16 |
| Black | 3.83 | 0.24 | 0.27 | |
| White | 23.6 | 0.25 | 0.29 | |

Now, looking at the architectures from the vantage of a parallel single controlled stack having a single pixel front surface area, the pixel reflects predetermined elected color by combining the results of setting certain layers to reflective state and certain layers to transparent state; or setting all to transparent state thereby allowing observation of the back most black layer. Each layer, with its particular encapsulated LC material, includes respective address-ability for the necessary access & activation of electric field.

It should be noted that embodiments of the present invention allow integration with other driving modes of LC materials in the encapsulated multi-layer apparatus. Partial Homeotropic States are maintained using fixed voltage or using electric pulses or the likes. For example, gray levels may be specified using fixed voltage pulses of predetermined duration and using variable frequency. This permits maintaining stable frequency signature reflectivity from the perspective of an observer who perceptually averages a plurality of millisecond time slots into a single gray level or color setting. It is especially facile for an apparatus, according to the present invention, to allow the observer to perceptually average transparent states with reflective states; thereby facilitating observation of time averaged intermediate states. Substantially, this technique facilitates video frame rates; with full freedom to simultaneously set and maintain a broad variety of gray levels.

BRIEF DESCRIPTION OF THE FIGURES

In order to understand the invention and to see how it may be carried out in practice, embodiments including the preferred embodiment will now be described, by way of non-limiting example only, with reference to the accompanying drawings, in which.

DETAILED DESCRIPTION OF THE INVENTION

Figure 11:
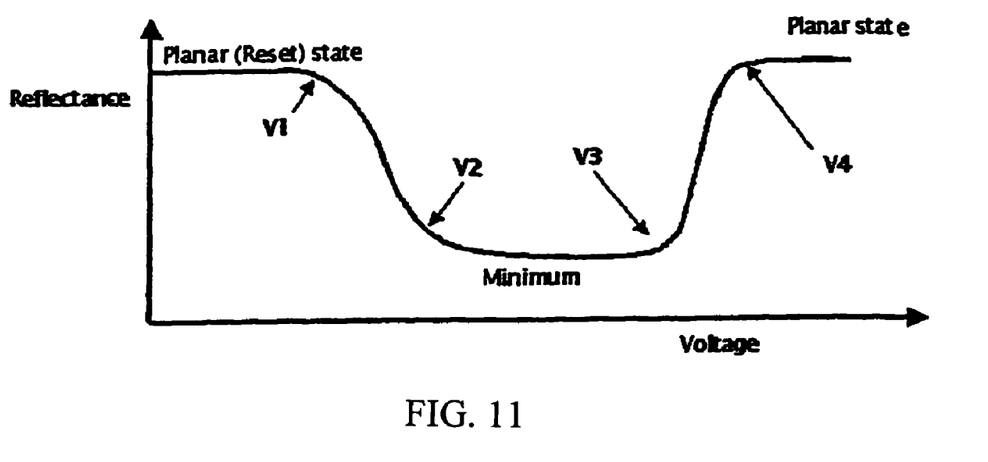
FIG. 11 illustrates a schematic view of a graph wherein the X-axis is voltage and the Y-axis is Reflectance.

A graph of the reflectance of a cholesteric liquid crystal against the applied voltage is shown in FIG. 11. In this graph:

V1—Maximum voltage that doesn't change the state of the material.
V2—The voltage needed to achieve minimum reflectance
V3—Voltage needed to "start" increase reflectance
V4—Voltage needed to set the material to planar state!

When a nematic liquid crystal is aligned such that the long axis of the molecules are perpendicular to the glass (or other) substrate it is said to be aligned Homeotropically. Usually two surfaces are used to form a thin film of liquid crystal and the nematic director propagates through the cell without any significant overall deviation. (The molecules undergo some thermal motion that makes them spin and wobble such that at any instant the molecules are locally not at 90 degrees to the substrates but on average over larger areas the average to 90 degrees.) This can be achieved either by surface aligning agents that usually lower the surface energy so that the molecules prefer to take up this position spontaneously or it can be induced by an electric field independent of any aligning agents that may be on the surface of the substrate.

Further, an induced nematic such as that created when a cholesteric liquid crystal of positive dielectric anisotropy has an electric field applied to it that is above the critical field (or V4 as shown in FIG. 11) to unwind the cholesteric helix, this is also known to be an Homeotropic texture.

The Homeotropic texture of a nematic phase (real or induced) is characterized by having its optic axis perpendicular to the substrate and therefore, in normal use, is also parallel to the incident light that is usually shone perpendicular to the substrates. Thus, when light is shone on this structure it is not deviated or polarized because the light is passing along the optic axis. Light scattering does not occur as the liquid crystal is effectively aligned as a single crystal with no changes of changes in refractive index along the light propagation direction. Thus, it appears very cleat or transparent to light (as long as the liquid crystal does not absorb the light which is usually the case).

This state is well known as the ON State in for example twisted nematic liquid crystal displays (where an electric field generates the Homeotropic State). It is also well known as the Off State in vertically aligned liquid crystal displays (where surface aligning agents generate the alignment).

It has been used in cholesteric displays by Harada who used it as one state in a device that switched between a scattering focal conic texture and a clear state (induced Homeotropic nematic).

Thus, the nematic Homeotropic State is well known and used in many displays as one state.

The transparency of this state has now been used to provide the black state of a surface stabilized cholesteric texture display. Conventionally this device operates between two long-term stable states that exist at zero voltage. The Homeotropic State is used as means to convert one stable state to another; it is used as meta-stable state. However, while one state is highly colored (the planar state) the other stable state is light scattering to some degree that depends on alignment and liquid crystal factors. Generally the operation of such a device that has a black absorbing material at the back of the device such that a transmitted light is absorbed. In the clear state created by the light scattering focal conic state the black is degraded by the scattering texture and this reduces the contrast ratio of the device (specified as the reflectance of the colored planar state/reflectance of the FC state).

The present invention uses the clear Homeotropic State rather than the opaque focal conic state as a base state, and this choice that leads to a much better black state and thus better contrast ratio than known mono or multi-layer (stacked) LCDs provide.

Figure 1:
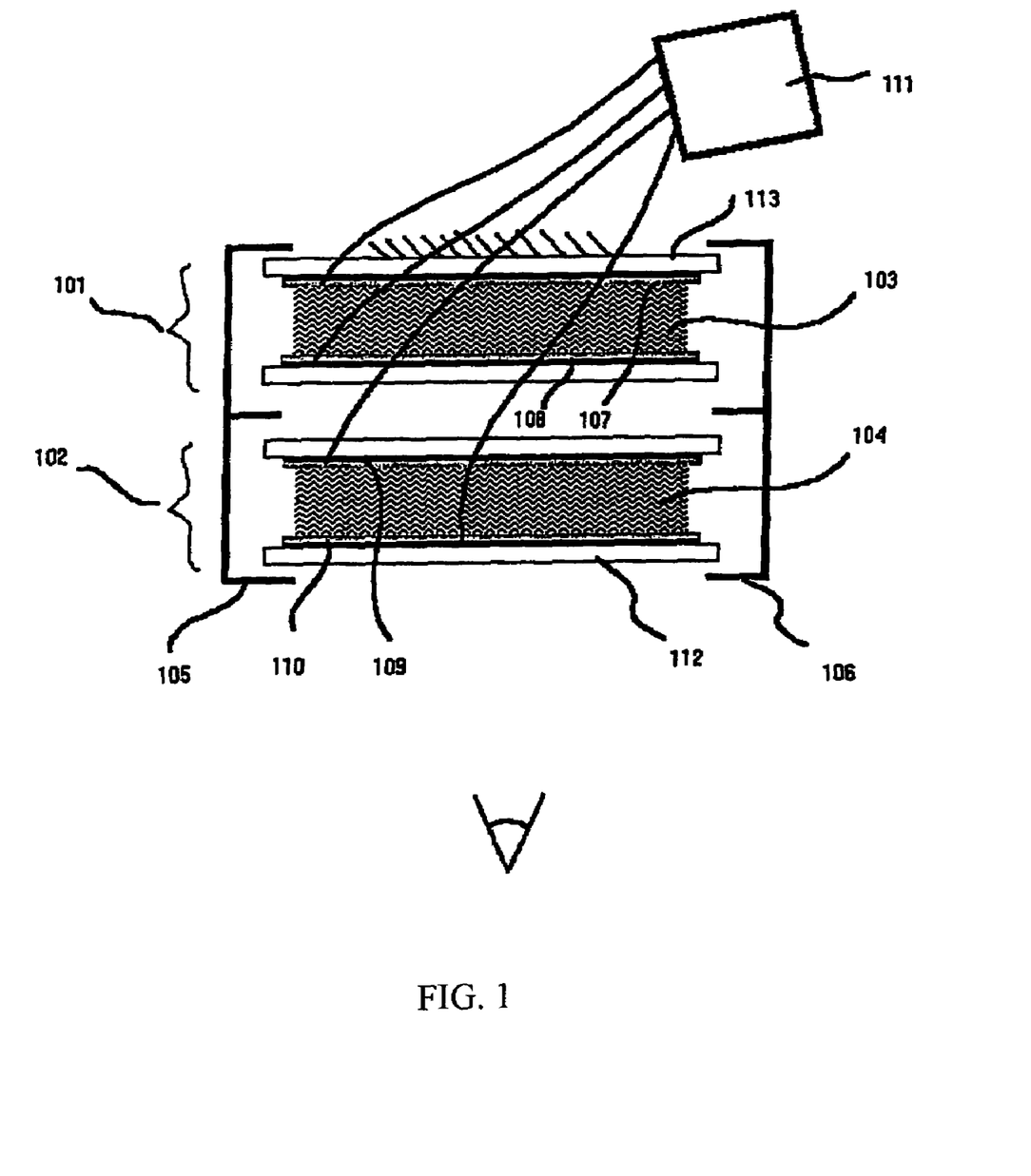
FIG. 1 illustrates a schematic view of a two layer distinct color LCD apparatus.

Turning to FIG. 1, the present invention relates to embodiments of a distinct color LCD apparatus including: at least two layers (101, 102) of respectively disparate encapsulated liquid crystal materials (103, 104); structural means (105, 106) for maintaining the layers proximate to each other and in a substantially parallel orientation; electrically conductive means (107, 108, 109, 110) for addressing at least one substantially parallel address across the encapsulated liquid crystal material in each of the respective layers; and coordinated with the means for addressing, an electrical pulse driving means (111)—wherein a state is substantially selected from the list Homeotropic and planar and whereby the state is communicated to a predetermined address between one of the parallel layers. In principle, the list of states may include slightly less threshold to Homeotropic State and the substantially planar state that, it "drops" into when the voltage is removed, focal conic state (which may be useful is a layer closest to a black back plate), or other substantially repeatable optical states. Nevertheless, the election and modulation between Homeotropic and planar states yields the characteristic maximum contrast improvement of the instant invention.

According to different aspects of the present invention, at least one layer of the at least two layers is a pair of glass (or plastic as appropriate to the application, etc.) plates; or the at least two layers includes a front plate made of glass (112); or a back plate made of glass and a back plate (113) made of a nonvolatile inert solid material. Glass (or transparent plastic—again, as appropriate) plates are preferable because they are substantially optically transparent, mechanically contributory to maintaining structural integrity, and chemically non-reactive. Nevertheless, other like materials may be used including various known plastics. Furthermore, once the structural integrity is addressed, such as by a glass plate or by a pair of glass plates or by using a rigid back surface, then an embodiment of the instant invention provides that the at least two layers includes at least one interstitial membrane; being lighter in weight than glass or plastic and having adequate optical and chemical properties.

According to the preferred embodiment of the instant invention, the back plate is colored black. Alternatively, the back plate is transparent or reflective or colored with a predetermined spectral bias selected to enhance color characteristics of the most proximate encapsulated LCD material in the at least two layers.

The at least two layers of LCD material of the instant apparatus preferably includes a combination selected from the list: a red layer and a green layer and a blue layer; a cyan layer and a magenta layer and a yellow layer; a red layer and a green layer; an orange layer and a blue layer; a yellow layer and a magenta layer. Furthermore, according to a novel embodiment of the instant apparatus, the combination further includes at least one "color" layer selected from the list: a black near ultra violet layer; a black near infra red layer; a black visible spectrum absorptive layer (preferably the layer furthest from an observer); or the likes.

According to a further aspect of the present invention, the electrically conductive means produces an electric field oriented substantially perpendicular across the encapsulated liquid crystal material in each of the respective layers—thereby easily facilitating addressable pixels of known optical states from normal viewing angles. Nevertheless, there may be other arrangements of conductive means where by the driving voltage is from one place on a surface of an encapsulated layer through (or across) the LC material to another place on the same surface or on an opposite surface.

According to a different aspect of the present invention, the electrically conductive means include ITO on facing surfaces of a layer of the at least two Layers. However, according to the threshold voltage requisite to drive to the Homeotropic State, according to another instant embodiment, the electrically conductive means include vapor deposited conductors on facing surfaces of a layer of the at least two layers.

The planar cholesteric phase reflects Bragg reflection a specific bandwidth of wavelengths that are determined by the liquid crystal mixture. This is usually about 100 nm bandwidth. By using three different color films that reject red, green and blue light stacked together, a white reflection can be achieved.

In the table below is shown data on stacked films of this type and the reflectance of the planar state (white) and focal conic state (FC) and Homeotropic State (H) for an earlier version of the VL module (presented above). The reflectance of the Homeotropic State is shown to be much lower than that of the focal conic state.

waveform selected from the list: Alternating Current (AC), Balanced Direct Current (bDC), Time Balanced Modulated Charges (tbMC), a combination of the aforesaid, any of the aforesaid within a predetermined decay envelope, or the likes.

In the present context: AC relates to equal contiguous portions of positive and negative voltage; bDC relates to proximate portions of positive and negative voltage which collectively comprise equal positive and negative areas of respective time multiplied by respective voltage; and tbMC relates to proximate portions of first positive and second positive voltages (or of first negative and second negative voltages) which collectively comprise equal areas of respective time multiplied by respective voltage, wherein the first voltage is applied to one surface of the encapsulated layer of LC material and the second voltage is applied to the other surface of the encapsulated layer—thereby substantially resulting in a nevertheless desires stable situation of no net charge available to migrate in the layer.

Furthermore, the waveform for the voltage areas is preferably square for purposes of threshold activation & deactivation efficiency, but allowably having other shapes such as trapezoidal, sinusoidal, saw-toothed, combinations of the aforesaid, or the likes. Nevertheless, it should be noted that voltage areas illustrated as square (or rectangular) are actually

| State of Red cell | State of Green cell | State of Blue cell | Percent Reflectance | X of Chromaticity diagram (CIE 1931) | Y of Chromaticity diagram (CIE 1931) | Contrast Ratio |
|---|---|---|---|---|---|---|
| Planar | Planar | Planar | 28.2 | .266 | .316 | |
| FC | FC | FC | 4.24 | .252 | .29 | 6.6 |
| H | H | H | 2.17 | .256 | .284 | 12.9 |

Thus by using the Homeotropic States in each cell the CR (contrast ratio) is substantially doubled due to the improved non-opaque perception of the "black" layer behind the three colored layers that are held in a transparent state (H/H/H).

To implement this regime the cell must have a sustaining voltage applied to the areas that need to be Homeotropic. Gray levels can be accomplished by for example dividing the time-period of a frame into several parts and addressing the pixel such that it is Homeotropic for a limited period only. The eye averages out this dithering such that it sees only a partial reflectance value rather than the full reflectance value; i.e. it sees a gray level. This can be done for each color. The planar states are produced in the conventional fast switch off from the Homeotropic texture to zero volts. As shown in FIG. 11, V1 substantially is the voltage below which there is no effect on the planar liquid crystal state "optical texture". Above V1, the planar texture is gradually converted to a focal conic texture. —Note that the planar texture is after the influence of an electric pulse—specifically after a rapid voltage transition from a voltage above V1 to a voltage below V1 albeit preferably to zero voltage.

According to the preferred aspect of the present invention, the electrical pulse driving means includes a Time Domain modulated signal and the signal is elected to have substantially at least one portion of an ensemble of portions providing a Homeotropic State and substantially at least one portion of the ensemble of portions providing a planar state; thereby facilitating maintaining a predetermined gray level—as detailed in the summary section (above). Furthermore, according to a practical aspect of the present invention, the electrical pulse electrical pulse driving means includes a slightly trapezoidal in practice since there is generally a miniscule ramp-up time and a miniscule ramp-down decay time in most familiar electronic drive electronic circuits. Drive time of Homeotropic State is reached by applying a continuous bipolar pulse—the pulse length can be varies. Longer pulses require lower voltage but the frequency of the applied voltage is visible. Voltage required for Homeotropic State ~7 to 10V per micron thickness (depending on LC type, PI type, PI thickness etc.).

According to a pragmatic aspect of the present invention, the electrical pulse driving means includes a controller for optimizing refresh time across an ensemble of the substantially parallel addresses. This controller may selectively interleave its refresh and modulation tasks among a large ensemble of addresses according to logic familiar to designers of storage display tubes, or to logic familiar to driving for raster display tubes, or according to temperature management modeling consistent with a large surface of relatively high voltage driven LCD layers, or the likes.

Figure 2:
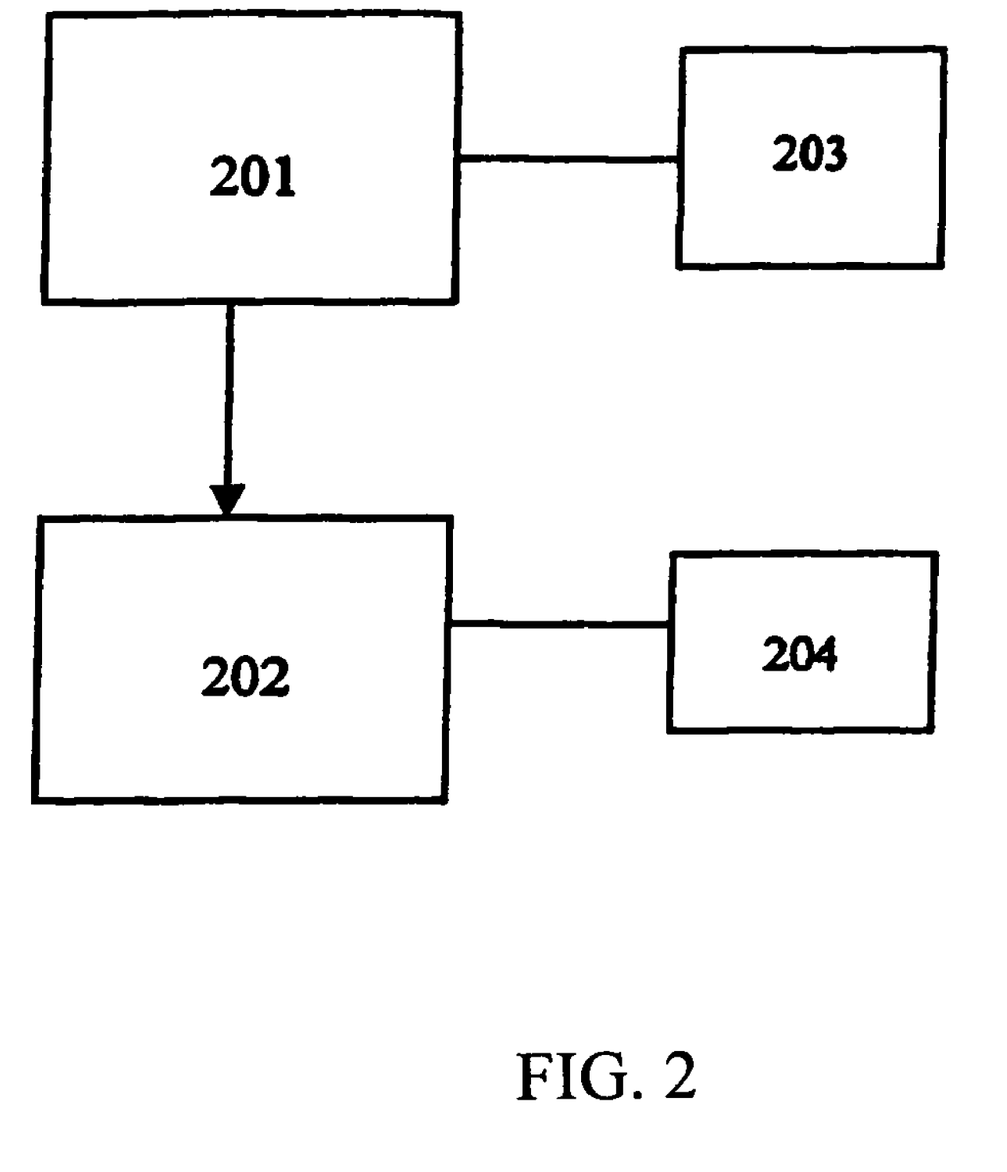
FIG. 2 illustrate schematic views of a method for providing distinct color in an LCD apparatus.

Turning to FIG. 2, the present invention also relates to embodiments of a method for providing distinct color in an LCD apparatus having at least two layers of respectively disparate encapsulated liquid crystal materials, structural means for maintaining the layers proximate to each other and in a substantially parallel orientation, electrically conductive means for addressing at least one substantially parallel address across the encapsulated liquid crystal material in each of the respective layers; and an electrical pulse driving means coordinated with the means for addressing, and the method includes the steps of: (A) selecting (201) a state from the list Homeotropic and planar and (B) communicating (202) the state to a predetermined address between one of the parallel layers.

According to the preferred aspect of the method of the present invention, selecting a state includes, for a predetermined location in a predetermined image, evaluating (203) at least one parameter selected from the list: color and gray level; and wherein communicating includes consistently electing (204) a predetermined address that is topologically parallel to the location in the predetermined image.

Furthermore, according to the preferred embodiment of the instant method, selecting a state is in accordance with the gray level and the selecting is a time domain dithered mixture of planar and Homeotropic States. In the present context, time domain dithering relates to selecting the frequency of the duration voltage driving fragments (components of AC, bDC, tbMC, combinations, or the likes—as defined above) in each state so that there is little or no appearance of visual flicker—gray level instability or fluctuation.

In summary, in conventional use of stabilized cholesteric texture devices, the stabilization of the planar and focal conic texture is optimized by either surface forces or polymer network within the LC fluid. However, in the context of the present invention—a direct drive situation, this optimization of the stability of the two states is not relevant any more. Usually the stabilization is to stop the focal conic spontaneously reverting (albeit maybe slowly) to the planar texture. Thus, one can optimize the surface to give the best possible planar state and not worry about stabilizing the unwanted focal conic state.

The conditions that optimize the reflectance of the planar state are linked to the viewing angle which in turn is linked to the number of 'domains' and the orientation that exist in the planar state. When the planar state is formed by removing an electric field, according to the present invention, very many random domains can be seen. Microscopically, these cause light scattering to occur and reduce the pureness of the reflected color; but also give a wider viewing cone over which the reflected color does not change. Thus, if there are fewer domains, then the angle of view will be smaller but the brightness on axis is higher. A partial technical object of the present invention is to substantially optimize the alignment so the LC gives a high reflectance with adequate viewing angle for applications; without the constraint of stabilizing the focal conic state. At present, it is indeterminate what this will mean for the alignment requirements, but one might guess that a low energy surface could help; which would not stabilize the focal conic state.

Figure 3:
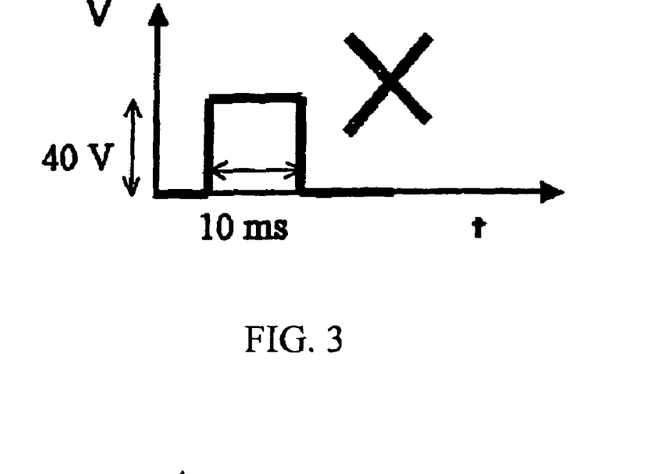
FIGS. 3-5 illustrate a schematic view of a graph wherein the x-axis is time in milliseconds and the Y-axis is in volts for an electrical pulse driving means.
Figure 4:
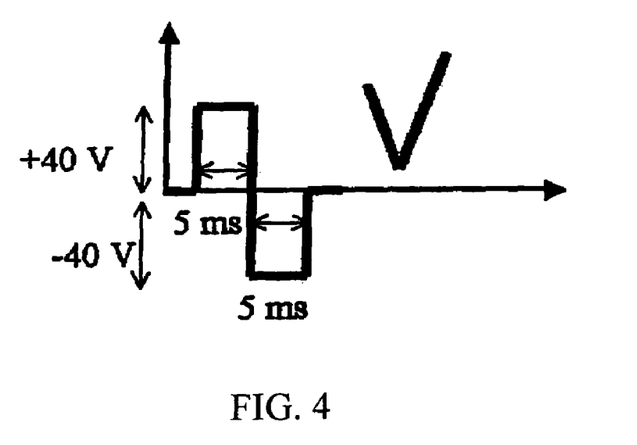
Figure 5:
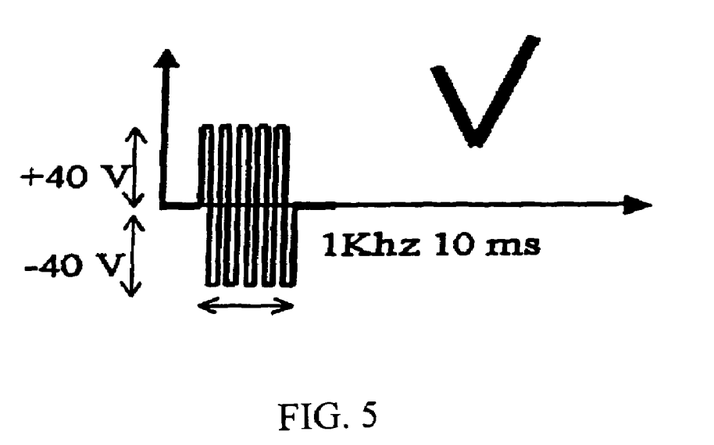
Figure 6:
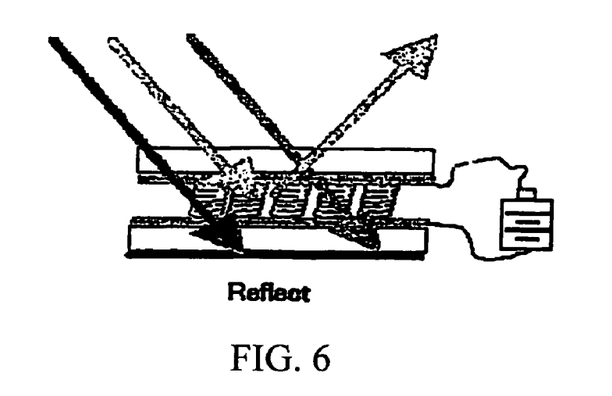
FIGS. 6-7 illustrate a schematic view of an apparatus wherein are disparate encapsulated liquid crystal materials.
Figure 7:
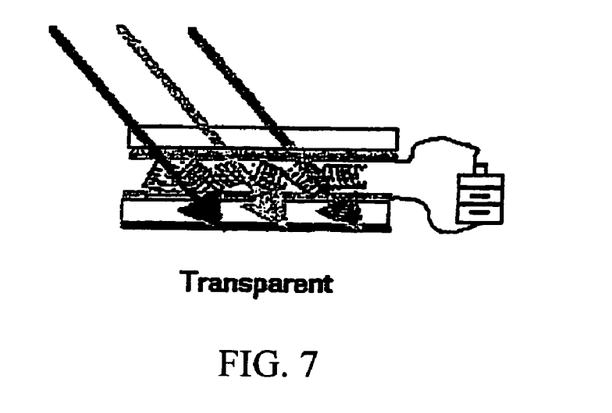
Figure 8:
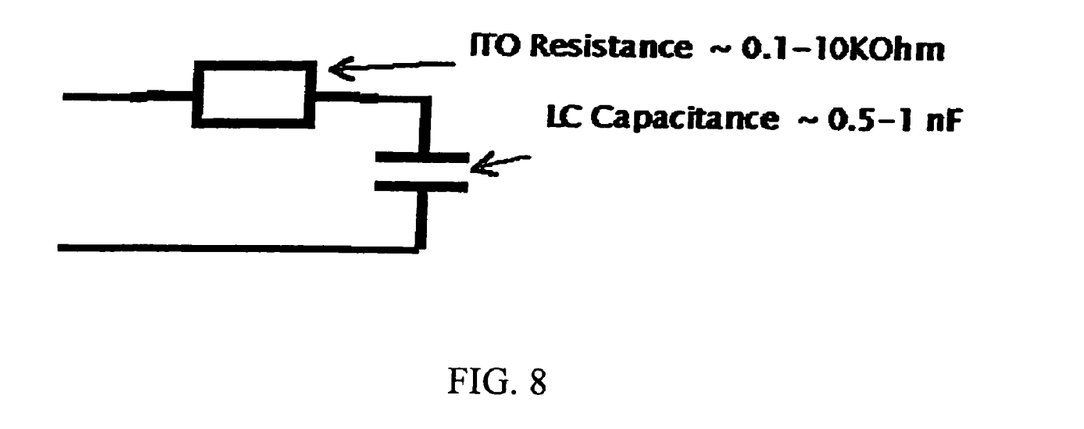
FIG. 8 illustrate a schematic view of an apparatus wherein is depicted an electrical pulse driving means.
Figure 9:
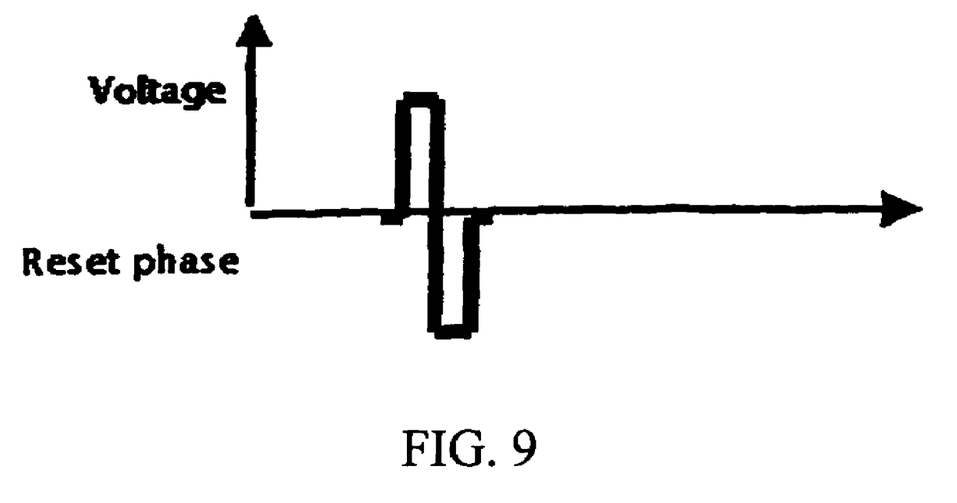
FIGS. 9-10 illustrate a schematic view of a graph wherein is respectively X-axis is time and Y-axis is Voltage and Reflectance for an electrical pulse driving means.
Figure 10:
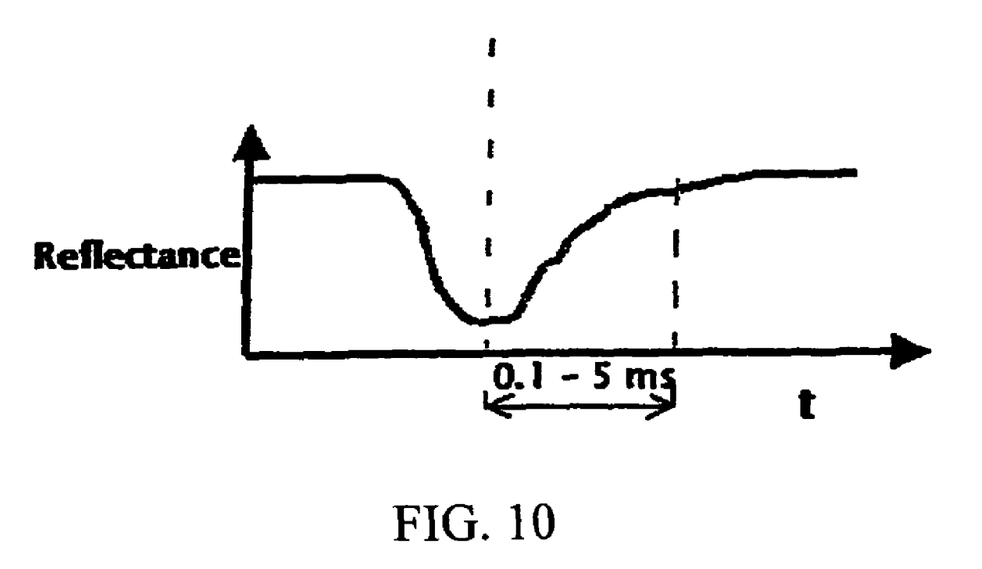
Figure 12:
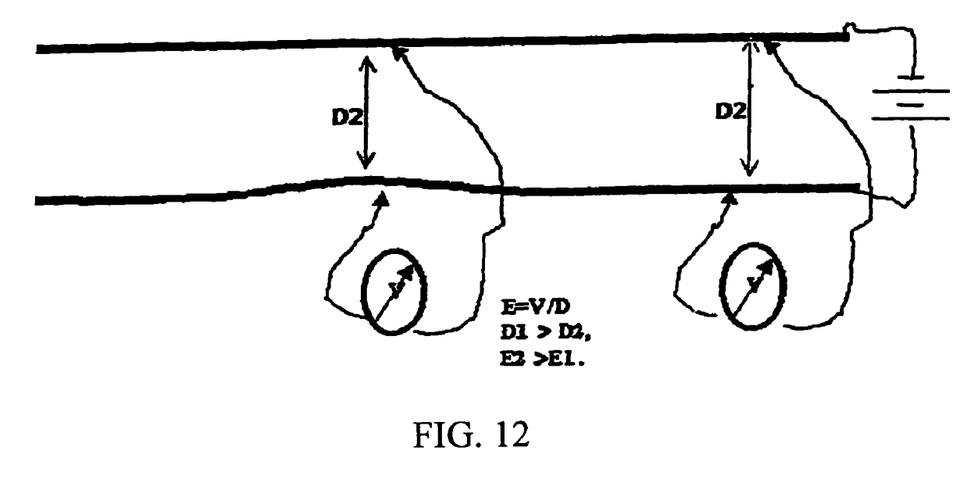
FIG. 12 illustrates a schematic view of an apparatus wherein are electrically conductive means for addressing at least one substantially parallel address across the encapsulated liquid crystal material in each of the respective layers.

FIGS. 3-5 illustrate a schematic view of a graph wherein the x-axis is time in milliseconds and the Y-axis is in volts for an electrical pulse driving means. In these figures we see typical Definitions
Of Driving:
Applying the appropriate voltage to change the SCT material to the desired reflectance state:
DC Balance:
The voltage applied to the LC should be zero dc balance (Each pulse should be symmetric)
FIGS. 6-7 illustrate a schematic view of an apparatus wherein are disparate encapsulated liquid crystal materials. In these figure:
SCT does not absorb light (only reflect or transparent) and the black level is achieved by back black paint so:
Bright corresponds to High reflection
Dark corresponds Low reflection—high transparency
In 3 layers—high transparency of one layer improves color purity of the other layers FIG. 8 illustrate a schematic view of an apparatus wherein is depicted an electrical pulse driving means. In these figure we see Electrical properties:
Equivalent electrical model of a single cell:
FIGS. 9-10 illustrate a schematic view of a graph wherein is respectively X-axis is time and Y-axis is Voltage and Reflectance for an electrical pulse driving means. In these figures: LC resistance is very high (>100 MOhm). Current flows only during charging of the cell.
Electrical time constant (<10 μsec.) is shorter than the "Mechanical/Physical" time constant (0.1-5 ms
FIG. 11 illustrates a schematic view of a graph wherein the X-axis is voltage and the Y-axis is Reflectance. In these figure we see further Electro optic curve:
V1—Maximum voltage that doesn't change the state of the material.
V2—The voltage needed to achieve minimum reflectance
V1-V2—Range of gray levels on the left side of the curve
V3—Voltage needed to "start" increase reflectance
V4—Voltage needed to set the material to planar state!
V3-V4 Range of gray levels on the right side of the curve.
FIG. 12 illustrates a schematic view of an apparatus wherein are electrically conductive means for addressing at least one substantially parallel address across the encapsulated liquid crystal material in each of the respective layers. In these figure we see other parameters:
Cell gap
LC mixture
Polyimide.
each of which depends on the color.
Local variation in those parameters in specific areas can cause "locally" shift in the curve and 'stains' (increase or decrease in reflectance of those areas).

The present invention has been described with a certain degree of particularity, however those versed in the art will readily appreciate that various modifications and alterations may be carried out without departing from either the spirit or scope, as hereinafter claimed.

The invention claimed is:

1. A distinct color LCD apparatus including:
at least one layer of encapsulated cholesteric liquid crystal material;
electrically conductive means for addressing a plurality of parallel addresses across the encapsulated cholesteric liquid crystal material in the at least one layer; and
an electrical pulse driving means connected to said electrically conductive means and arranged to supply drive signals to the plurality of parallel addresses to drive the cholesteric liquid crystal material selectively into a homeotropic state or a planar state, the electrical pulse driving means being arranged to supply drive signals which provide a predetermined grey level by driving the cholesteric liquid crystal material, within successive frames each having a predetermined time period which is sufficiently short that an average reflectance of the color LCD apparatus over the predetermined time period is perceived without the appearance of visual flicker, into homeotropic state in a fraction of said predetermined time period and into the planar state in the remainder of said predetermined time period, said fraction being selected in accordance with the grey level.

2. The distinct color LCD apparatus according to claim 1, further including a pair of glass plates on opposite sides of the at least one layer of encapsulated cholesteric liquid crystal material.

3. The distinct color LCD apparatus according to claim 1, further including a front plate made of glass.

4. The distinct color LCD apparatus according to claim 1, further including a back plate made of glass.

5. The distinct color LCD apparatus according to claim 1, further including a back plate made of a nonvolatile inert solid material.

6. The distinct color LCD apparatus according to claim 5, wherein the back plate is one selected from the group consisting of being colored black, being transparent and being reflective.

7. The distinct color LCD apparatus according to claim 5, wherein the back plate is colored with a predetermined spectral bias selected to enhance color characteristics of the most proximate encapsulated cholesteric liquid crystal material in the at least one layer.

8. The distinct color LCD apparatus according to claim 1, further including at least one "color" layer selected from the list:
   A. a black near ultra violet layer;
   B. a black near infra red layer;
   C. a black visible spectrum absorptive layer.

9. The distinct color LCD apparatus according to claim 1, wherein the electrically conductive means are arranged to generate an electric field oriented substantially perpendicular across the at least one layer of encapsulated cholesteric liquid crystal material.

10. The distinct color LCD apparatus according to claim 1, wherein the electrically conductive means includes ITO on facing surfaces of the at least one layer.

11. The distinct color LCD apparatus according to claim 1, wherein the electrically conductive means includes vapor deposited conductors on facing surfaces of the at least one layer.

12. The distinct color LCD apparatus according to claim 1, wherein the electrical pulse driving means is arranged to supply drive signals which provide a predetermined grey level by the drive signals being formed, in a number of predetermined portions into which said time period is divided, to drive the cholesteric liquid crystal material into the homeotropic state in a number of the portions and into the planar state in the remainder of the portions.

13. The distinct color LCD apparatus according to claim 1, wherein the electrical pulse driving means is arranged to generate a waveform selected from the list: Alternating Current (AC), Balanced Direct Current (bDC), Time Balanced Modulated Charges (tbMC), combinations of the aforesaid, and any of the aforesaid within a predetermined decay envelope.

14. The distinct color LCD apparatus according to claim 1, wherein the electrical pulse driving means includes a controller for optimizing refresh time across an ensemble of the substantially parallel addresses.

15. The distinct color LCD apparatus according to claim 1, including at least two said layers of encapsulated liquid crystal material maintained proximate to each other and in a substantially parallel orientation.

16. The distinct color LCD apparatus according to claim 15, further including structural means for maintaining the at least two said layers proximate to each other and in a substantially parallel orientation.

17. The distinct color LCD apparatus according to claim 15, further including an interstitial membrane between a pair of the at least two layers.

18. The distinct color LCD apparatus according to claim 15, wherein the cholesteric liquid crystal material of each one of the at least two layers reflects light of a respective color in the planar state.

19. The distinct color LCD apparatus according to claim 17, wherein said colors of the at least two layers include a combination selected from the list:
   A. a red layer and a green layer and a blue layer;
   B. a cyan layer and a magenta layer and a yellow layer;
   C. a red layer and a green layer;
   D. an orange layer and a blue layer;
   E. a yellow layer and a magenta layer.

20. The distinct color LCD apparatus according to claim 1, wherein the electrically conductive means provides direct drive of each of said plurality of substantially parallel addresses.

21. A method of driving a distinct color LCD apparatus, said apparatus including at least one layer of encapsulated cholesteric liquid crystal material and electrically conductive means for addressing a plurality of parallel addresses across the encapsulated cholesteric liquid crystal material in the at least one layer, the method comprising:
   supplying electrical drive signals to said electrically conductive means to drive the cholesteric liquid crystal material selectively into a homeotropic state or a planar state, said drive signals providing a predetermined grey level by driving the cholesteric liquid crystal material, within successive frames each having a predetermined time period which is sufficiently short that an average reflectance of the color LCD apparatus over the predetermined time period is perceived without the appearance of visual flicker, into homeotropic state in a fraction of said predetermined time period and into the planar state in the remainder of said predetermined time period, said fraction being selected in accordance with the grey level.

* * * * *